(No Model.)
S. A. JAN GRAW.
BICYCLE.
No. 330,123. Patented Nov. 10, 1885.
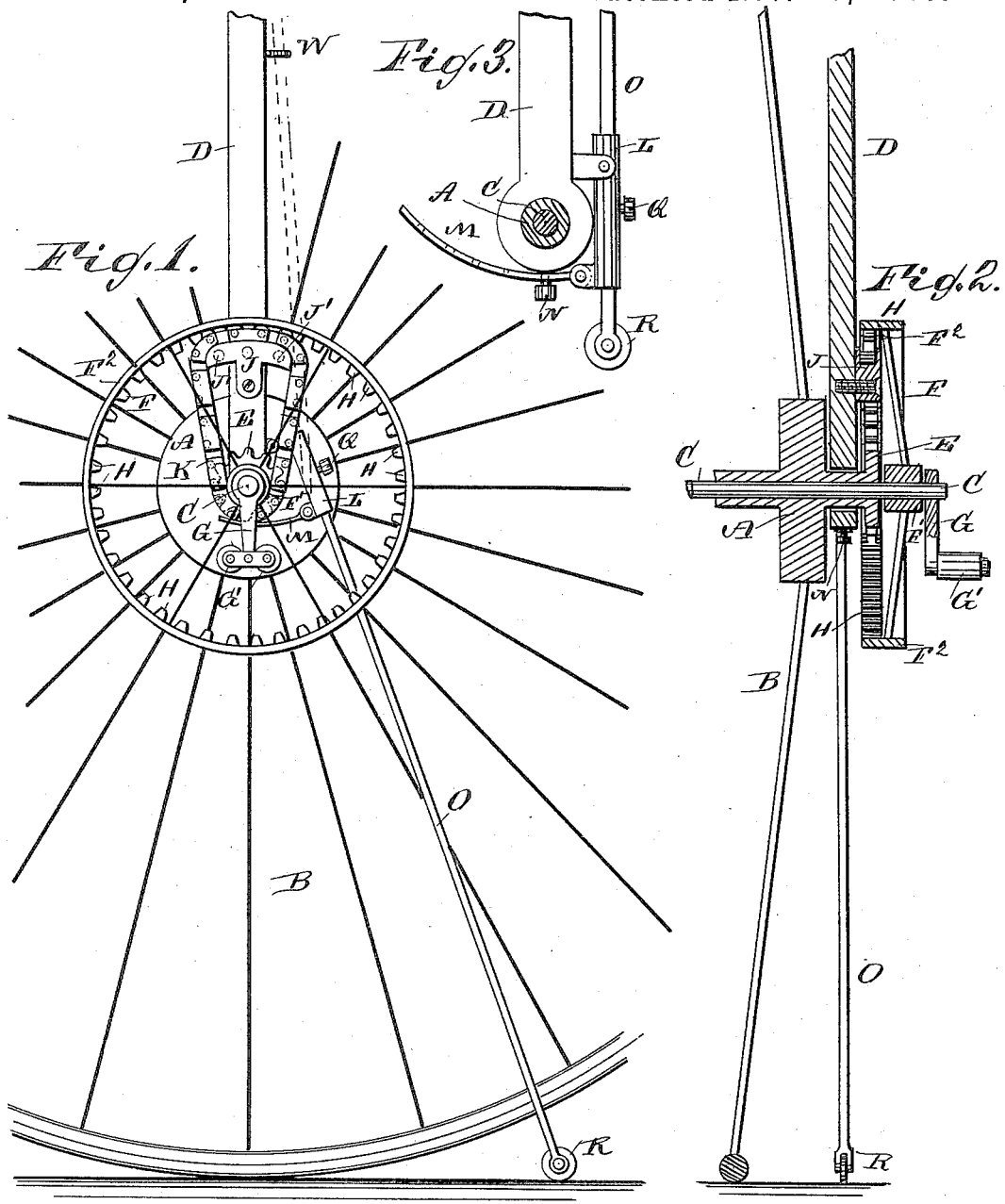
WITNESSES:
INVENTOR:
S. A. JanGraw
BY Munn & Co
ATTORNEYS.

UNITED STATES PATENT OFFICE.

SELDEN A. JAN GRAW, OF NASHUA, NEW HAMPSHIRE.

BICYCLE.

SPECIFICATION forming part of Letters Patent No. 330,123, dated November 10, 1885.

Application filed September 16, 1885. Serial No. 177,245. (No model.)

*To all whom it may concern:*

Be it known that I, SELDEN A. JAN GRAW, of Nashua, in the county of Hillsborough and State of New Hampshire, have invented a new and Improved Bicycle, of which the following is a full, clear, and exact description.

The object of my invention is to provide a new and improved bicycle which is constructed to give great speed, and which is provided with a safety-attachment to prevent headers or tilting of the bicycle.

The invention consists in the construction and combination of parts and details, as will be fully set forth and described hereinafter, and pointed out in the claims.

Reference is to be had to the accompanying drawings, forming part of this specification, in which similar letters of reference indicate corresponding parts in all the figures.

Figure 1 is a side view of the central wheel part of my improved bicycle. Fig. 2 is a cross-sectional view of the same. Fig. 3 is an enlarged detail side view of the guide for the safety-rod. Fig. 4 is an enlarged detail plan view of the guide for the driving-chain.

The hub A of the driving-wheel B is loosely mounted on the axle C, and is also journaled in the lower end of the shank of the fork D. On each end of the hub A a toothed wheel, E, is mounted, through which the axle or shaft C also passes, and outside of each wheel E the hub F' of a wheel, F, is rigidly mounted on the shaft C, and outside of each wheel F a crank, G, provided with a foot-rest, G', is mounted on the shaft or axle, the foot-rest being of the usual construction.

On the inner surface of the rim $F^2$ of the wheel F teeth or cogs H are formed, which are of the same size as the teeth on the cog-wheels E.

On the outer side of each shank of the fork D a bracket, J, is secured, which has a segmental top, and in the top of said bracket a series of transverse anti-friction rollers, J', are mounted.

A driving-chain, K, formed of links united by cross-pins, is passed over each bracket J and cog-wheel E, and engages with the inner teeth of the corresponding wheel, F, as shown.

To each shank of the fork D a tube, L, is hinged at the top of said tube, and at the front edge of the shank, and on the lower end of the said tube L, a curved bar, M, is hinged, which is provided with a series of apertures, through any one of which a screw, N, can be passed into the lower end of a shank of the fork for the purpose of holding the tube L at the desired inclination. A rod, O, is passed freely through the tube L, and can be locked in place in the same by a binding-screw, Q.

A roller, R, is pivoted in the lower end of the rod O. An eye, W, or eyes are provided on the fork for holding the upper end of the rod O. If desired, a shield or protector may be extended from the shaft C upward on the fork to protect the legs of the rider from the wheel E, which guard, shield, or protector may be made of wire-netting or of any other suitable material.

The operation is as follows: The treadles are operated in the usual manner, and thereby the shaft C and the wheels F on the same are revolved, and as the teeth H of the wheels F engage the link-chain K, the cog-wheels E on the hub of the driving-wheel are revolved. The speed of the velocipede can be regulated as desired by changing the proportional sizes of the wheels F and E. For example, the wheels E and F can be so adjusted that the wheel E makes three revolutions for every revolution of the wheel F, or, instead of three, five or six revolutions. The teeth H of the wheel F cannot fail to engage the link-chain, as the link-chain must pass over the bracket J, which is quite close to the inner surface of the rim of the wheel A at the top of the same. When it is desired to prevent headers, the rods O are drawn down until the rollers R in their lower ends are a short distance above the ground. Said rods O also prevent the bicycle from tilting over sidewise and permit the rider to stop whenever he pleases without requiring him to dismount. The inclination of the rods O is regulated by the tube L, which can be inclined more or less, and then locked in place by the screw N, passed through the arm M. When the rollers R rest on the floor or ground, the rods can be used as braces to hold the bicycle erect while mounting it.

Having thus described my invention, what I claim as new, and desire to secure by Letters Patent, is—

1. A bicycle having its driving-wheel mounted loosely on the main shaft, having treadles or devices for operating it, cog-wheels on the hub of the wheel, cog-wheels rigidly mounted on the shaft, and driving-chains passed over the cog-wheels on the hub, and operated by the cog-wheels on the shaft, substantially as herein shown and described.

2. A bicycle having its driving-wheel mounted loosely on the main shaft, having treadles or other devices for revolving it, cog-wheels on the hub of the wheel, internally-cogged wheels mounted rigidly on the shaft, chains passed over the cog-wheels on the hub and engaged with the teeth on the internally-cogged wheels, and projections on the shanks of the fork of the bicycle, over which projections the chains pass, substantially as herein shown and described.

3. In a bicycle, the combination, with the fork D and shaft C, of the wheel B, loosely mounted on the shaft, the cog-wheels E on the hub of the wheel, the internally-cogged wheels F on the shaft, the brackets J on the fork D, having rollers J', and the driving-chains K, substantially as herein shown and described.

4. In a bicycle, the combination, with the fork D and wheels, of the tube L, pivoted on the fork, and the rod O, passed through said tube, substantially as herein shown and described.

5. In a bicycle, the combination, with the fork D and the wheels, of the tube L, pivoted on the fork, the arm M, hinged on the tube, and of the rod O passed through the tube L, substantially as herein shown and described.

6. In a bicycle, the combination, with the fork D and wheels, of the tube L, pivoted to the fork, the rod O, passed through the said tube, and a roller pivoted on the lower end of said rods, substantially as herein shown and described.

SELDEN A. JAN GRAW.

Witnesses:
E. B. GOULD,
J. N. WOODWARD.